United States Patent [19]

Ohlendorf et al.

[11] Patent Number: 5,109,726

[45] Date of Patent: May 5, 1992

[54] CAMSHAFT WITH BARREL-SHAPED SHANK

[75] Inventors: Rolf Ohlendorf, Weinstadt; Gerhard Haussmann, Leinfelden; Karl Krejci, Ostfildern, all of Fed. Rep. of Germany

[73] Assignee: Daimler-Benz AG, Fed. Rep. of Germany

[21] Appl. No.: 502,704

[22] Filed: Apr. 2, 1990

[30] Foreign Application Priority Data

Apr. 21, 1989 [DE] Fed. Rep. of Germany ....... 3913104

[51] Int. Cl.⁵ .................. F16H 53/00; F01L 1/04
[52] U.S. Cl. .................. 74/567; 74/568 R; 29/421.1; 123/90.60
[58] Field of Search ............ 74/567, 569, 53, 54, 74/55; 123/90.60, 90.31; 29/523, 505, 421.1, 156.4 R, 522.1; 72/58

[56] References Cited

U.S. PATENT DOCUMENTS

| 4,612,695 | 9/1986 | Umeha et al. | 29/505 |
| 4,638,683 | 1/1987 | Ogawa et al. | 74/567 |
| 4,660,269 | 4/1987 | Suzuki | 29/523 |
| 4,829,951 | 5/1989 | Hafele | 123/90.60 |
| 4,875,270 | 10/1989 | Krips et al. | 29/421.1 |
| 4,922,785 | 5/1990 | Arnold et al. | 74/567 |

FOREIGN PATENT DOCUMENTS

| 0230731 | 8/1987 | European Pat. Off. | 74/567 |
| 1910517 | 9/1970 | Fed. Rep. of Germany | 74/567 |
| 2213224 | 9/1973 | Fed. Rep. of Germany | 74/567 |
| 3521206 | 12/1986 | Fed. Rep. of Germany | 74/567 |
| 3720597 | 8/1988 | Fed. Rep. of Germany | 74/567 |
| 61-248912 | 6/1986 | Japan | 74/567 |
| 0236965 | 10/1986 | Japan | 74/567 |

*Primary Examiner*—Vinh T. Luong
*Attorney, Agent, or Firm*—Evenson, Wands, Edwards, Lenahan & McKeown

[57] ABSTRACT

A camshaft, especially for high-power internal-combustion engines, has bearing points and cams consisting of a base circle and a cam face. The bearing points and cams are connected to one another by non-cylindrical shank portions. In order to increase the bending resistance of the camshaft and, at the same time, to provide a predetermined necessary clearance for machining tools, a shank portion between two cams is made barrel-shaped, with a maximum diameter which is located in the middle region of the shank portion and which is equal to or less than the diameter of the base circle.

2 Claims, 1 Drawing Sheet

# CAMSHAFT WITH BARREL-SHAPED SHANK

BACKGROUND AND SUMMARY OF THE INVENTION

The present invention relates to a camshaft which has improved bending resistance and, more particularly, to a camshaft having a barrel-shaped shank portion between a pair of cams, with a maximum diameter in the middle region of the shank portion equal to or less than the base circle of the cams.

A camshaft is described in German Offenlegungsschrift 2,213,224 for the purpose of increasing the design strength of the camshaft. To do so, a continuous transition to the functional faces of the cam and of the bearing point is provided, but with varying cross-sectional forms with essentially straight generatrices of the shank portions being obtained. Due to the non-circular cross-sectional forms even next to the cams, a camshaft of this type can be produced and machined only at a considerable expense, and in particular lateral constrictions also make the machining of the functional faces by grinding more difficult.

Furthermore, a camshaft is described in German Auslegeschrift 1,910,517, in which non-cylindrical shank portions located between two cams and between these and a bearing point have contours curved inwards, as seen in elevational view.

An object of the present invention is to provide a camshaft of high rigidity, which is simple to produce and the machining of which, especially of the functional faces such as the cams, is not made difficult and is not restricted by the shank portions.

According to the present invention, the foregoing objects are achieved by providing non-cylindrical shank portions to connect bearing points with cams, in which shank portions between two cams are barrel-shaped with a maximum diameter located on the middle region of the barrel-shaped shank portions. Also, frustoconical shank portions are formed between a cam and a bearing point.

The camshaft according to the present invention has relatively large diameters in the shank portions between the cams and therefore a high bending resistance. At the same time, those regions of the shank portions near the cams are set back or undercut to such an extent that the machining and chamfering of the cam faces, for example by shaping grinding, are not impaired, with the necessary clearance for the grinding wheels being ensured.

By virtue of the present invention, there is no possibility of grinding down the shank portions, thereby initiating a notch effect which reduces the rigidity of the camshaft. Since the shank portions preserve an overall circular cross-sectional form everywhere, it is possible for them to be produced and machined at a low cost.

As seen in an elevational view, the middle region of the barrel-shaped shank portions between two cams has the shape of an arc defined by a circle which has a radius of curvature on the order of magnitude of the base circle of the cam. This configuration assures high bending resistance and keeps the cams free for machining.

The frustoconical shank portions between a cam and bearing point ensure an increased bending resistance of the shank portions between the cams and the bearing points and therefore of the camshaft as a whole, without impairing access to the cam faces and the bearing points for machining purposes and without departing from the circular cross-sectional form of the shank portions.

These and other features, objects and advantages of the present invention will become more apparent from the following detailed descriptions of a presently preferred embodiment when taken in conjunction with the accompanying drawings.

DETAILED DESCRIPTION OF THE DRAWINGS

Figure 1:
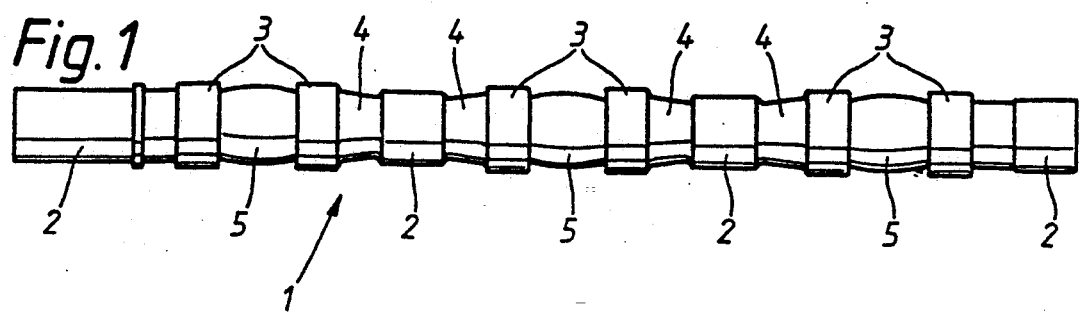
FIG. 1 is an elevational view of a camshaft of the present invention.

A camshaft 1 illustrated in FIG. 1 has several bearing points 2, by means of which the camshaft 1 is mounted in bearings (not shown) of a housing of, for example, an internal-combustion engine in a known manner. Moreover, the camshaft 1 carries several cams 3 which are arranged in pairs (the double lead lines from a single numeral 3) and which serve respectively for driving inlet and outlet valves (not shown), again in a known manner. Located between each cam 3 and the respective inner bearing point 2 is a frustoconical shank portion 4 with the cone opening, i.e., the cone diameter widening, towards the cam 3.

In the vicinity of the bearing point 2 and of the cam 3, the diameters of this shank portion 4 are, respectively, somewhat smaller than the diameter of the bearing point 2 and the base circle 9 of the cam 3, so that access to the bearing point 2 and the cam 3 for machining purposes remains unimpaired, but the bending resistance with the frustoconical shank portion 4 is clearly higher than with a cylindrical shank portion with a diameter corresponding to the smallest diameter of the shank portion 4.

Figure 2:
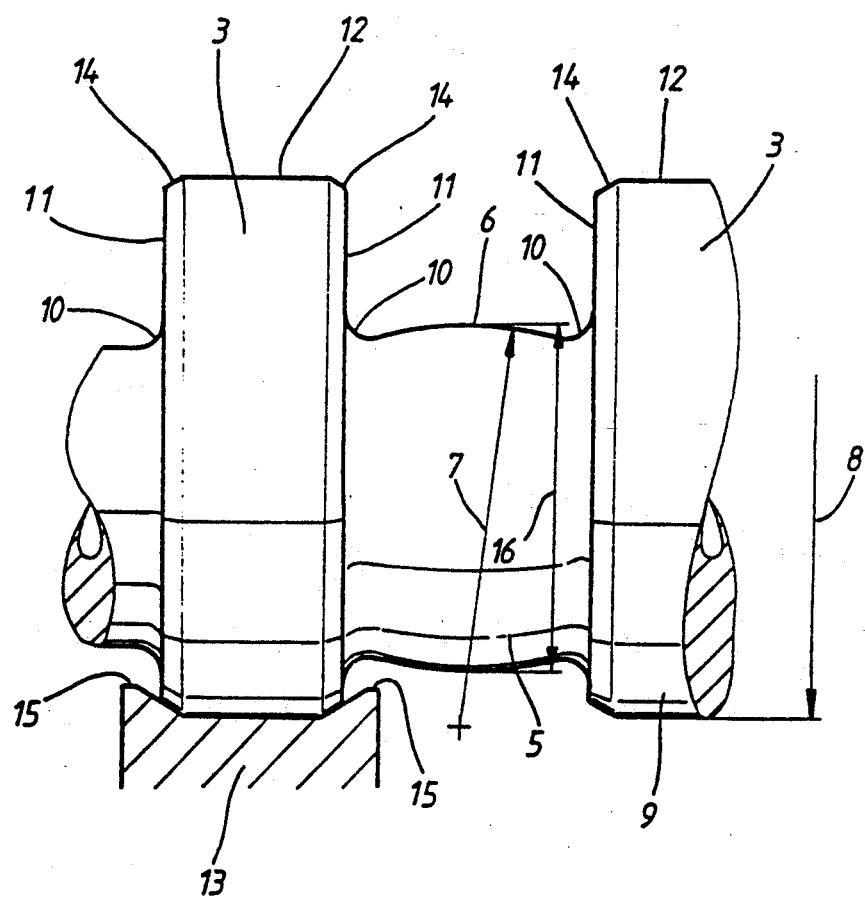
FIG. 2 is a magnified section of the camshaft of FIG. 1 with a machining tool, such as a grinding wheel, at a cam.

A shank portion 5 is arranged between every pair of cams 3 and is made barrel-shaped symmetrically in relation to its transverse mid-plane. As seen in the elevational view of FIG. 1, the shank portion 5 has in its middle region the form of an outwardly curved circular arc 6 with a radius of curvature 7 which is on the order of magnitude of the diameter 8 of the base circle 9 of the cam 3. The maximum diameter 16 of the shank portion 5 in this middle portion is slightly smaller than the base-circle diameter 8. Adjoining the circular arc 6 on both sides, as far as the cams 3, are inwardly curved arcs 10 which merge smoothly into the side faces 11 of the cam 3. The shank portion 5 is therefore drawn in further in its regions near the cams than in its middle region, so that there is enough room with sufficient tolerance for the machining of the base circle 9 and of the cam face 12. This is especially true when this machining is carried out by means of a shaped grinding wheel 13, as shown on FIG. 2, which simultaneously machines chamfers 14 on the cam 3 and additionally protrudes with its side regions 15 of larger diameter into the space at the side of the cams 3.

While we have shown and described an embodiment in accordance with our invention, it should be understood that the same will be susceptible to some changes and modifications in light of the above without departing from the principles of our invention. Therefore, we do not intend to be limited to the specific details shown and described herein, but to embrace all such changes and modifications within the scope of the appended claims.

What is claimed is:

1. A camshaft, adapted for high-power internal combustion engines, comprising bearing points, cams having a base circle and a cam face, and non-cylindrical first shank portions connecting the bearing points and cams and also connecting the cams, and a second shank portion between two adjacent cams having a convexly curved outer surface and a maximum diameter of the surface in a middle region of the shank portion, as viewed along the length of the camshaft being no greater than a diameter of the base circles of the cams wherein a shank portion of the first shank portions between each cam and bearing point has a frustoconical shape, with a wider diameter towards the cam.

2. The camshaft according to claim 1, wherein, as viewed along the length of the camshaft, the middle region of the convexly curved second shank portion between two adjacent cams has the form of a circular arc, with a radius of curvature of the arc, as viewed along the length of the camshaft, on the order of magnitude of the diameter of the base circles.

* * * * *